United States Patent
Hellberg et al.

(10) Patent No.: US 7,098,723 B2
(45) Date of Patent: Aug. 29, 2006

(54) SEMICONDUCTOR CIRCUIT REGULATOR

(75) Inventors: Henrik Hellberg, Solna (SE); Anders Emericks, Solna (SE); Håkan Sjödin, Knivsta (SE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/470,520

(22) PCT Filed: Jan. 25, 2002

(86) PCT No.: PCT/SE02/00137
§ 371 (c)(1),
(2), (4) Date: Nov. 21, 2003

(87) PCT Pub. No.: WO02/061838

PCT Pub. Date: Aug. 8, 2002

(65) Prior Publication Data
US 2004/0119094 A1    Jun. 24, 2004

(30) Foreign Application Priority Data
Jan. 31, 2001  (SE) .................. 0100282

(51) Int. Cl.
*H03K 3/01* (2006.01)
*G05F 1/10* (2006.01)
*G05F 3/02* (2006.01)

(52) U.S. Cl. .............. 327/534; 327/538; 379/413

(58) Field of Classification Search ............ 327/534, 327/535, 538, 540, 541
See application file for complete search history.

(56) References Cited

U.S. PATENT DOCUMENTS

| 4,473,758 A * | 9/1984 | Huntington | 327/537 |
| 4,556,804 A * | 12/1985 | Dewitt | 327/434 |
| 4,686,388 A * | 8/1987 | Hafner | 327/537 |
| 5,159,207 A * | 10/1992 | Pavlin et al. | 327/534 |
| 5,182,469 A * | 1/1993 | Farley et al. | 327/534 |
| 5,210,675 A * | 5/1993 | Palara | 361/91.6 |
| 5,448,198 A * | 9/1995 | Toyoshima et al. | 327/530 |
| 5,737,411 A | 4/1998 | Apfel et al. | 379/413 |
| 6,097,113 A * | 8/2000 | Teraoka et al. | 307/125 |
| 6,351,176 B1 * | 2/2002 | Houston | 327/534 |
| 6,388,302 B1 * | 5/2002 | Galli | 257/498 |
| 6,665,354 B1 * | 12/2003 | Drapkin et al. | 375/316 |
| 6,741,098 B1 * | 5/2004 | Takahashi et al. | 326/81 |

FOREIGN PATENT DOCUMENTS

| EP | 0 800 212 | 10/1997 |
| EP | 0 957 626 | 11/1999 |

OTHER PUBLICATIONS

Sching et al., "Electronic Circuits", 1979, pp. 252-253.*

\* cited by examiner

*Primary Examiner*—Tuan T. Lam
(74) *Attorney, Agent, or Firm*—Fish & Richardson P.C.

(57) ABSTRACT

In a circuit designed to output a varying output voltage, the substrate of the semi-conductor component is connected to a regulator, in particular a switch, connected to a lower potential than the potential of the substrate of the circuit. The circuit can for example be used in a Subscriber Line Interface Circuit (SLIC).

7 Claims, 4 Drawing Sheets

SEMICONDUCTOR CIRCUIT REGULATOR

TECHNICAL FIELD

The present invention relates to a regulator in a semiconductor circuit.

BACKGROUND

In most Integrated Circuit (IC) processes, the active components are formed by an n-type epitaxial layer formed on a substrate of p-type.

Around the active components a p-type diffusion is formed for providing an isolation. The p-type isolation is short circuited to the substrate of the integrated circuit. The substrate must in such a case be given a potential corresponding to the lowest potential in the circuit in order to be able to provide a reverse biasing of the substrate and isolation pn-transitions in relation to islands of active components formed on the substrate.

However, even though the islands of active components are reverse biased to the substrate, there are always currents from the components to the substrate, so called substrate currents. The substrate currents can be leakage currents from reverse biased areas around the component islands or other minority charge carriers injected from, for example, a forward biased base in an npn transistor or a forward biased emitter or collector in a lateral pnp-transistor.

In circuits designed to have high voltage supplies, these substrate currents can contribute to a significant part of the total power consumption in the integrated circuit.

The potential of the substrate is usually supplied via a pin provided on the package of the integrated circuit. The pin is in turn connected to a pad on the circuit, which pad in turn is connected via a metal conductor to the isolation diffusion area to the substrate. Since the substrate voltage is distributed over the entire integrated circuit it is possible, anywhere on the integrated circuit, to attach a contact to an isolation diffusion in order to gain access to the substrate voltage.

Thus, it is not necessary to form separate metal connections for this voltage unless a very low resistance or very low noise is required in the application. In some applications the substrate itself and the isolation is made a part of the semiconductor component, for example in a so-called substrate pnp transistor, where the isolation around the transistor and the substrate is designed as a collector.

Since the substrate potential is the lowest potential in a circuit, the substrate potential together with the highest supply voltage will decide the available voltage range in the circuit.

In some applications, for example a Subscriber Line Interface Circuit (SLIC) providing a ring signal in a telephone system, it is desired to vary the output voltage from the circuit.

In the case with a SLIC providing an output ring signal, it is common to use a so called off-hook battery when the SLIC is in a speech mode and another battery, a so called ring battery, having an output voltage being higher, in absolute value, than the off-hook battery in a ringing mode.

The supply voltages in SLICs is usually lower than the ground voltage, and the potential of the substrate determines the voltage range available in the SLIC. In order to switch between the different batteries used in the different modes an integrated battery switch is provided.

In FIG. 1 such a switch S in accordance with the prior art is shown implemented in a SLIC being designed to output a ring signal. During transmission of speech, when the SLIC is in a speech mode, a voltage applied over the load RL, i.e. the telephone set of a subscriber being connected to the SLIC and the line to/from the subscriber, will be lower in absolute value than the voltage of the off-hook battery OHB.

The current from the load RL will pass a diode D2 to the off-hook battery OHB, which can have a voltage of about −50 volt and the voltage Vbat2 applied to the load will be about −50 volt.

When the SLIC is in a speech mode the switch S will be open. When it is determined that the SLIC is to output a ring signal over the load RL, i.e. when it is determined that the telephone set of the subscriber connected to the SLIC is to ring, the switch is activated and closed.

As a result, the potential Vbat2 will be the same as the voltage of the ringing battery RB, in this case −90 volt. The diode D2 will now be reverse biased and will not conduct any current. The line driving circuits A and B are now connected to the ringing voltage and can apply it over the load in order to thereby increase the voltage when delivering the ring signal.

However, in speech-mode, there is a problem of power losses associated with the technique in accordance with the prior art. Thus, the leakage current from the circuitry will flow to the substrate sbt, which has a potential corresponding to a high voltage drop and hence the leakage currents will cause a significant power loss.

SUMMARY

It is an object of the present invention to provide an improved semiconductor circuit having less power losses than the prior art.

It is a further object of the present invention to provide a mechanism whereby the substrate potential of a semiconductor device can be controlled to an optimal value for a specific mode of operation.

These objects and others are obtained by a circuit designed to output a varying output voltage wherein the substrate of the semi-conductor component is connected to a regulator, in particular a switch, being connected to a potential being lower than the potential of the substrate of the circuit.

BRIEF DESCRIPTION OF THE DRAWINGS

The present invention will now be described in more detail and with reference to the accompanying drawings, in which.

DESCRIPTION OF PREFERRED EMBODIMENTS

Figure 1:
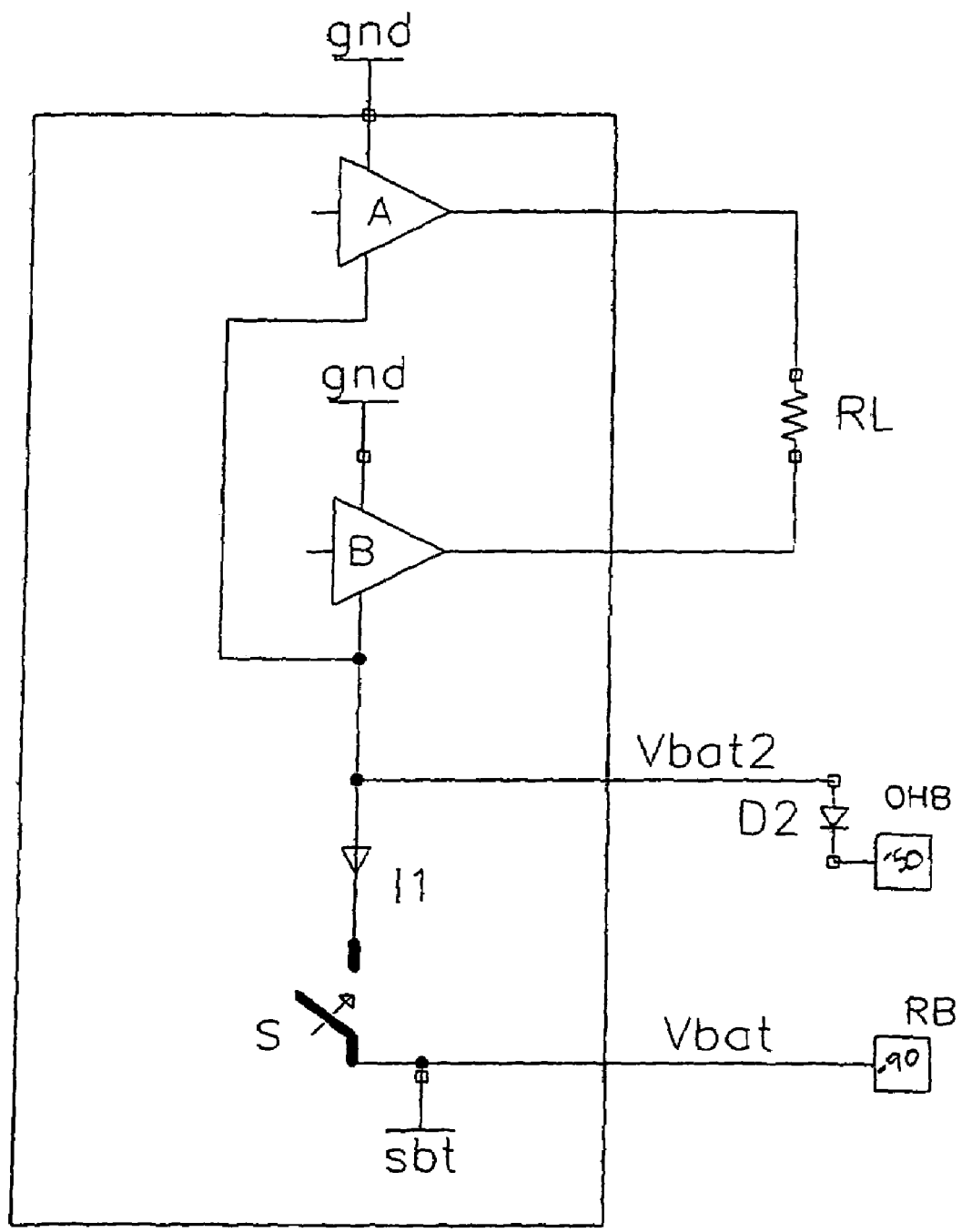
FIG. 1 described above, is a circuit diagram illustrating a SLIC in accordance with the prior art.
Figure 2:
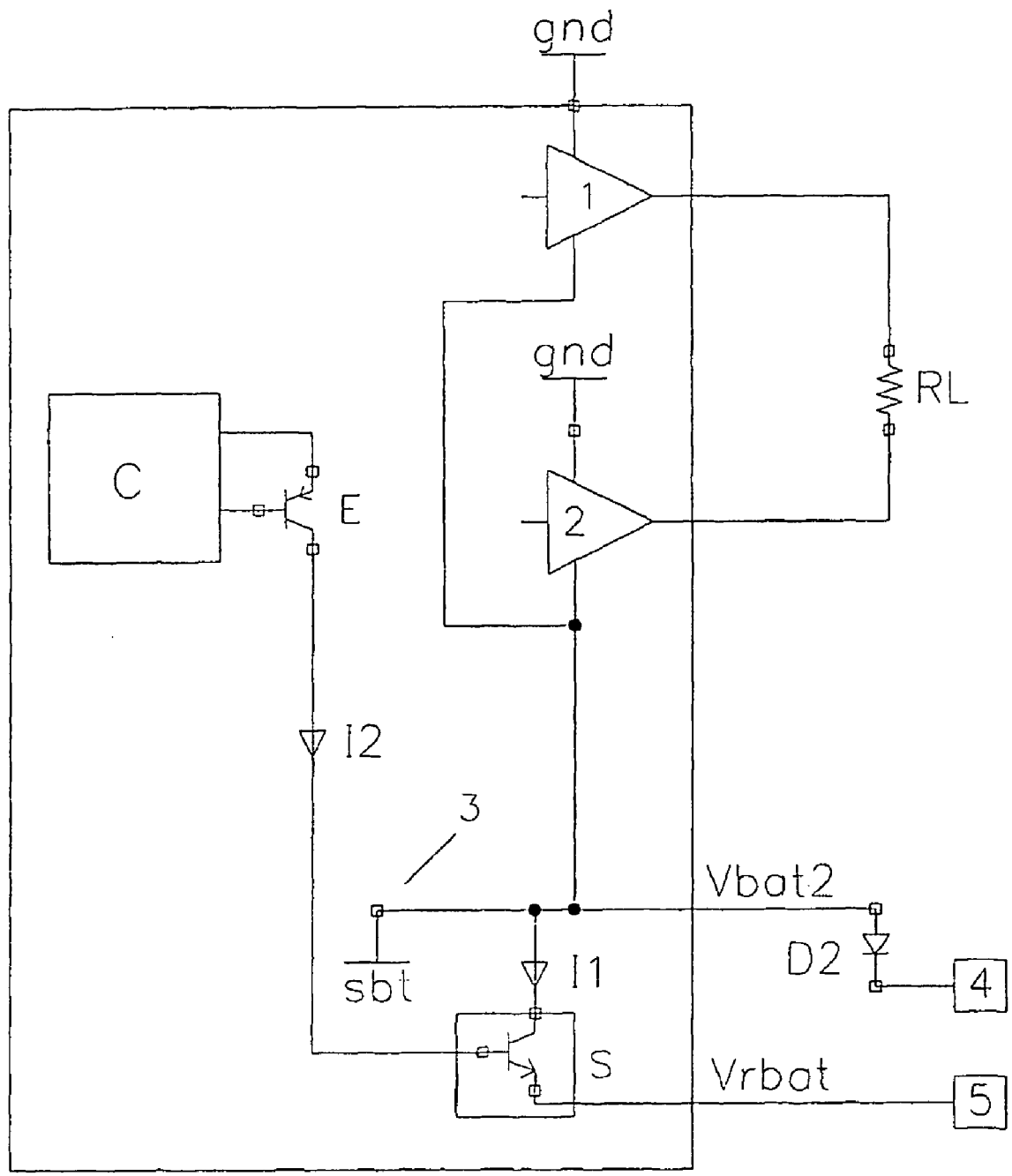
FIG. 2 is a circuit diagram illustrating a first embodiment of the invention.

In FIG. 2 a circuit diagram of a Subscriber Line Interface Circuit (SLIC) is shown. The SLIC comprises a first amplifier stage 1 being connected between a potential Vbat2 and ground gnd and a second amplifier stage 2 being connected between the potential Vbat2 and ground gnd. The output terminals from the amplifier stages 1 and 2 form the output terminals from the SLIC between which output terminals a load RL is connected.

The terminals of the amplifier stages that are connected to the potential Vbat2 are further connected to the substrate 3 of the integrated circuit on which the SLIC is formed and to a first battery 4 having a first output voltage Vbat2 via a diode D2. The battery 4 can have an output voltage of about −50 volt.

The terminals of the amplifier stages that are connected to the potential Vbat2 are also connected to a first terminal of a switch S. A second terminal of the switch S is connected to a second battery 5 having a second output voltage Vrbat. The output voltage of the battery 5 preferably has a greater absolute output voltage and can for example be −90 volt.

The switch S further has a third control terminal. In response to the current fed to the control terminal of the switch S a connection between the first and second terminal is opened and closed, respectively. Thus, the switch S is interconnected between the supply voltage having the highest absolute voltage and the substrate of the integrated circuit.

In FIG. 2, the switch is shown as a single npn transistor. The potential of the emitter and the base of the transistor is close to the ringing battery potential and the collector terminal of the transistor is short circuited to the substrate potential. Thus, the potential of the npn collector cannot be below the potential of the substrate, since the collector-isolation diode then would be forward biased.

The control current I2 applied to the switch S, i.e. the current applied to the base terminal of the npn transistor can be supplied by a lateral pnp transistor E as illustrated in FIG. 2. The lateral pnp transistor's collector, in this example being of p-type, can have a potential being below the potential of the substrate, since the base terminal of the pnp transistor can be reverse biased.

The potential of the base terminal of the lateral pnp transistor, i.e. an epitaxial n⁻ island, can be above the substrate potential and can be controlled by a circuit C operating at a potential being close to the ground potential.

There are several advantages by such an arrangement. Thus, during transmission of speech, the switch S is open and the potential Vbat2 is essentially the output voltage from the first battery 4.

Since the substrate now is connected to this potential all leakage currents will be applied to a potential corresponding to the output voltage of the first battery 4 instead of the second battery 5, which has a greater output voltage. Hereby the power losses resulting from leakage currents will be significantly reduced when the SLIC is in a speech mode.

Also, all substrate pnp transistors, i.e. a pnp transistor having its collector connected to the substrate potential of the transistor, can be kept without increasing the power consumption. Otherwise, it would have been necessary to replace any such substrate pnp transistors with larger conventional pnp transistors and to connect the collectors of the larger transistors to Vbat2 as in FIG. 2, which would result in additional metal interconnects having to be formed, which of course is undesired.

Furthermore, the risk for avalanche phenomena in a circuit as described in conjunction with FIG. 2 will be greatly reduced. This is due to the fact that the circuit can be designed so that active parts of the circuit when the switch is closed, i.e. when the circuit is in a ringing mode, can be implemented using components having a higher breakdown voltage.

Also, the circuit will be more reliable, since the substrate potential will be closer to the ground potential and the voltage drop between metal conductors, possible poly-silicon cross-unders and resistors crossing the isolation will be lower. The high voltage is only applied when a ring signal is issued, which is a relatively short time compared to the total active time of the circuit.

It is further to be noted that the switch/regulator can be formed so that no n-doped islands, i.e. npn transistor collector terminals or lateral pnp transistor base terminals and pnp-collector terminals are located at a potential below thpotential of the substrate. Hence, only, the base and emitter terminals of the two npn-transistors are located below the substrate potential.

Figure 3:
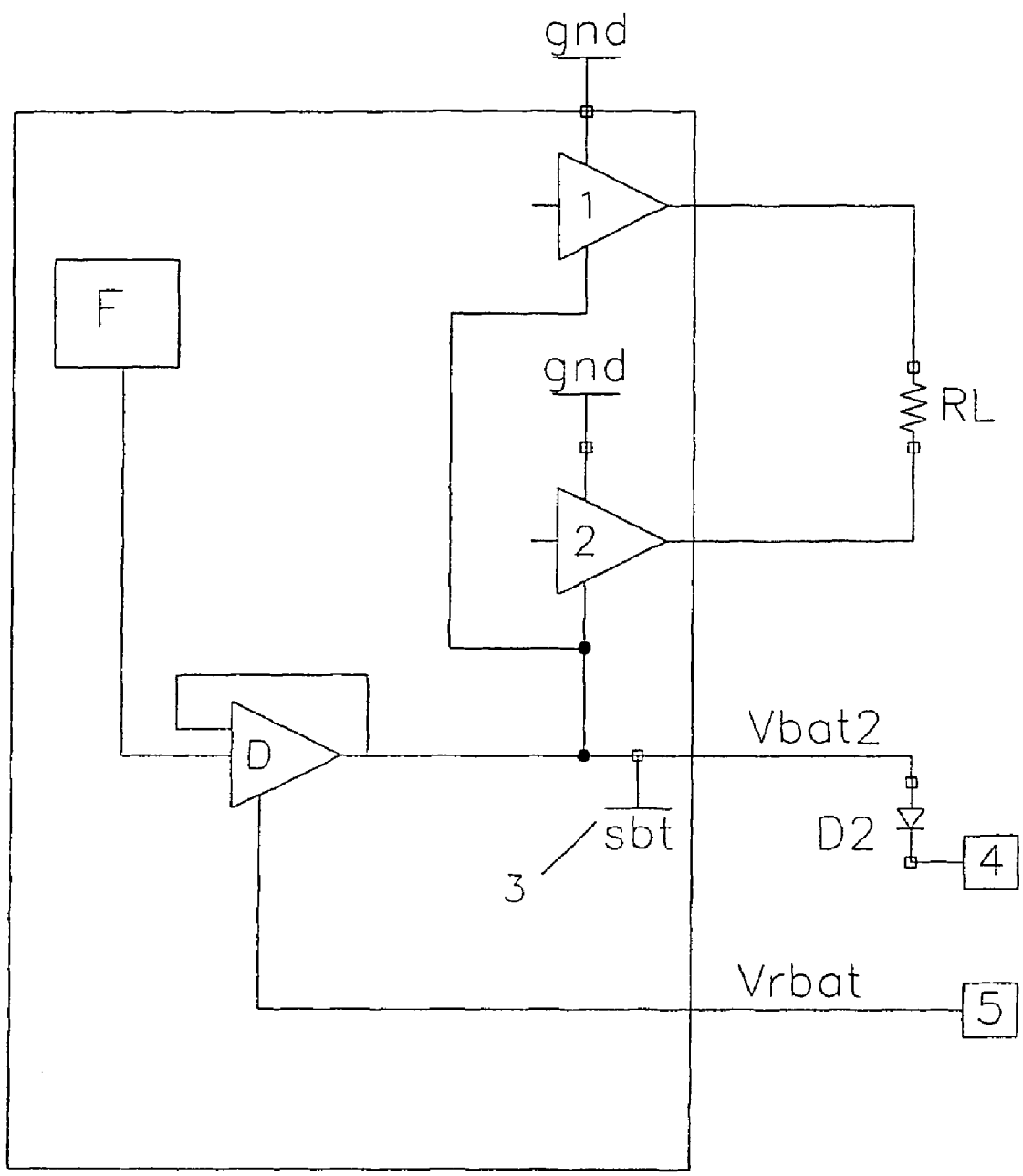
FIGS. 3 is a circuit diagram in accordance with a second embodiment of the invention.
Figure 4:
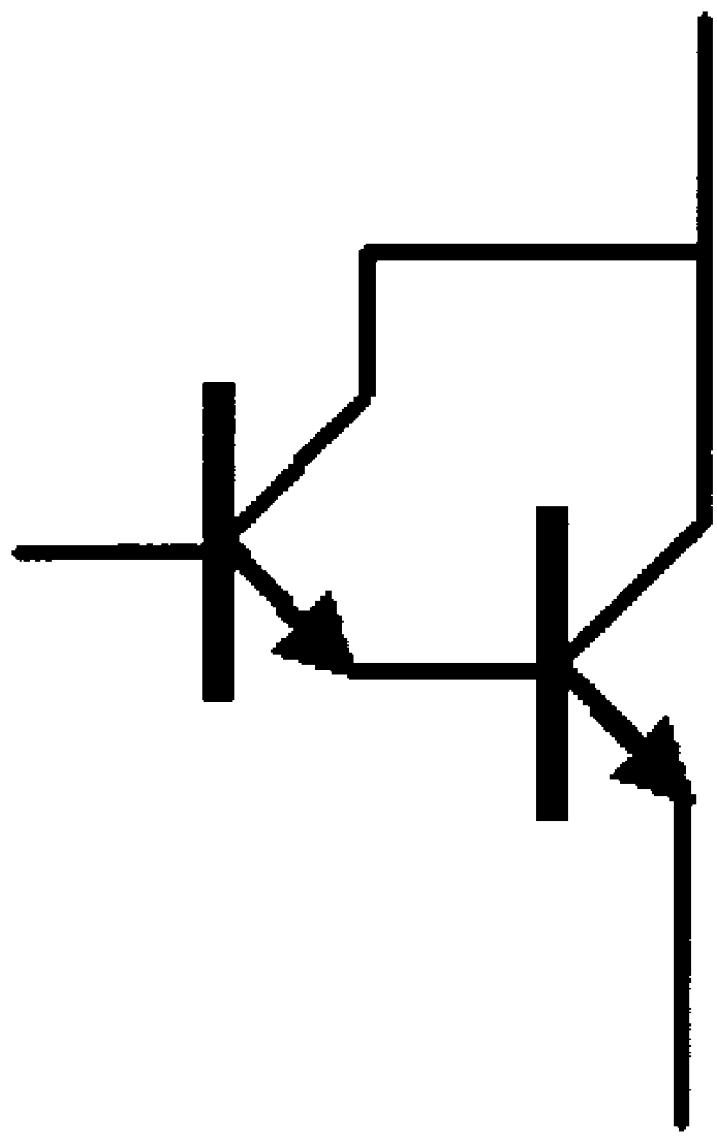
FIG. 4 is a circuit diagram of two transistors in a Darlington configuration.

In FIG. 3, an implementation in accordance with a second embodiment is shown. The difference between the circuits in FIGS. 2 and 3 is that the switch S is replaced by a regulator D. The advantage of using a regulator instead of a switch is that the substrate potential then can be placed anywhere between the ringing battery, i.e. battery 5, and the off-hook battery, i.e. battery 4.

The regulator D can be controlled in accordance with one or several parameters to change Vbat2 to a value between the voltage of battery 4 and the voltage of battery 5 by means of e.g. a control voltage provided by a control circuit F. For example, it will be possible to monitor one or several transistors having a breakdown potential being lower than the rest of the circuit. Thus, it will be possible to maximise the absolute value of the substrate potential and hence the ring voltage of the individual circuit.

Further, the output voltages of the batteries used can be given a higher and a lower value in such an implementation. For example, the ringing battery, battery 5 can have an output voltage of −110 volt and the off-hook battery, battery 4, can have an output voltage of −24 volt.

In the examples given herein the use of a regulator being connected to a potential which is below the potential of the substrate is illustrated in conjunction with a SLIC. The invention is however not restricted to use in a SLIC but can of course be used in other applications where the circuit is designed to use different supply voltages in different modes of operation.

Further, the regulator can be formed in any suitable way, for example using MOS transistors, thyristors or other semiconductor components.

Also, it is not required to use a p-type substrate. Thus, it is possible to use an n-type substrate. In such an application the potentials used will be above ground potential, and the substrate will have a potential corresponding to the highest potential of the circuit.

Finally, the circuit as described herein only comprises two different voltage supplies. However, in some applications it can be required or desired to use only one voltage supply besides ground, or to use three or more different supply voltages and the regulator circuitry as described herein can then of course be modified to such applications.

The invention claimed is:

1. A semiconductor circuit comprising:
a substrate;
a first voltage supply terminal for receiving a first voltage having a non-zero first voltage magnitude, the first voltage supply terminal being in electrical communication with the substrate;
a second voltage supply terminal for receiving a second voltage having a second voltage magnitude greater than the first voltage magnitude; and a regulator for applying, to the substrate, a voltage within a closed interval between the first voltage and the second voltage, the regulator being disposed on an electrical path between the second voltage supply terminal and the substrate; and wherein the semiconductor circuit is configured to output a varying output voltage to a load; and wherein the semiconductor circuit is configured to apply the first voltage to the substrate during transmission of a speech signal and to apply the voltage within the closed interval between the first voltage and the second voltage during transmission of a ring signal.

2. The circuit of claim 1, wherein the regulator comprises a first transistor.

3. The circuit of claim 2, wherein the first transistor comprises an npn transistor.

4. The circuit of claim 2, wherein the regulator further comprises a second transistor connected to the first transistor in a Darlington configuration.

5. The circuit of claim 3, wherein the regulator further comprises a second npn transistor connected to the first npn transistor in a Darlington configuration.

6. A subscriber line interface circuit incorporating the semiconductor circuit of claim 1.

7. The circuit of claim 1, wherein the regulator comprises a switch.

* * * * *